United States Patent
Satoh et al.

(10) Patent No.: US 9,931,934 B2
(45) Date of Patent: Apr. 3, 2018

(54) VEHICULAR POINTER-TYPE RESIDUAL QUANTITY METER

(71) Applicants: NIPPON SEIKI CO., LTD., Nagaoka-shi, Niigata (JP); HONDA MOTOR CO., LTD., Tokyo (JP)

(72) Inventors: Takumi Satoh, Nagaoka (JP); Koji Tohyama, Nagaoka (JP); Saiichiro Kosuge, Nagaoka (JP); Munehiro Yasuda, Wako (JP); Kotaro Takashima, Wako (JP)

(73) Assignees: NIPPON SEIKI CO., LTD., Nagaoka-Shi (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/189,323

(22) Filed: Jun. 22, 2016

(65) Prior Publication Data

US 2016/0375771 A1     Dec. 29, 2016

(30) Foreign Application Priority Data

Jun. 24, 2015 (JP) ................................ 2015-126897

(51) Int. Cl.
*B60Q 1/00* (2006.01)
*B60K 37/02* (2006.01)

(52) U.S. Cl.
CPC ...... *B60K 37/02* (2013.01); *B60K 2350/1064* (2013.01); *B60K 2350/203* (2013.01); *B60K 2350/352* (2013.01); *B60K 2350/408* (2013.01)

(58) Field of Classification Search
CPC ........ B60R 21/01516; B60R 21/01532; B60R 21/0152; B60R 21/01554;
(Continued)

(56) References Cited

U.S. PATENT DOCUMENTS 4,194,396 A * 3/1980 Ohsawa .................. G01F 23/36
116/229
2005/0083008 A1 * 4/2005 Oishi ........................ H02P 8/34
318/696
(Continued)

FOREIGN PATENT DOCUMENTS

JP 2007-271426 10/2007
JP 2015-078857 4/2015

*Primary Examiner* — Daniel Previl
(74) *Attorney, Agent, or Firm* — Rankin, Hill & Clark LLP

(57) ABSTRACT

A vehicular pointer-type residual quantity meter comprises: a display panel that has a scale part which allows a driver to recognize a residual quantity, and a non-scale part that differs from the scale part; a pointer unit that is disposed behind the display panel; a pointer driver body unit that carries out a movement of the pointer unit in a real space; and a control unit that controls the pointer driver body unit in so that the pointer unit indicates one of metering regions in the scale part in replay to a current residual quantity. The control part controls the pointer driver body unit so that when the residual quantity decreases to zero, the pointer unit moves from a metering region corresponding to a zero residual quantity in a direction opposite to a metering region corresponding to a residual quantity value greater than zero to the non-scale part of the display panel.

5 Claims, 3 Drawing Sheets

(58) Field of Classification Search
CPC .... B60R 2021/01088; B60R 21/01526; B60R 21/0154; A61B 5/1116; A61B 5/6891; A61B 2560/0214; A61B 2562/046; A61B 2562/164; A61B 2562/22
USPC .... 340/438, 488, 439, 995.2, 435–436, 463, 340/525, 555, 691.6, 815.45, 815.6
See application file for complete search history.

(56) References Cited

U.S. PATENT DOCUMENTS

| | | | | |
|---|---|---|---|---|
| 2005/0083187 | A1* | 4/2005 | Birman | B60K 35/00 340/438 |
| 2007/0247291 | A1* | 10/2007 | Masuda | F02D 11/105 340/439 |
| 2008/0271527 | A1* | 11/2008 | Hewitt | G01F 23/164 73/299 |
| 2010/0289637 | A1* | 11/2010 | Ewers | B60K 37/02 340/488 |
| 2015/0109756 | A1* | 4/2015 | Choi | B60K 37/02 362/23.01 |

* cited by examiner

FIG. 2
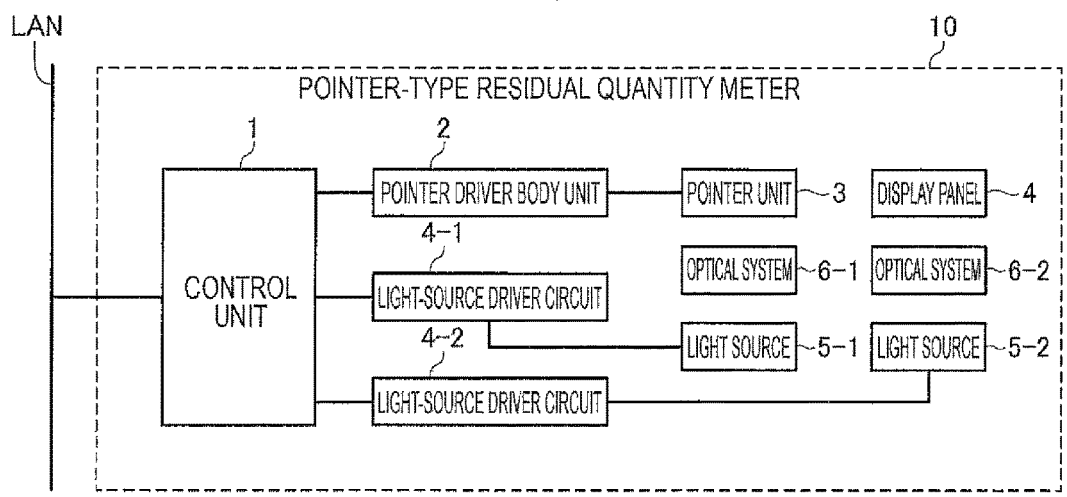
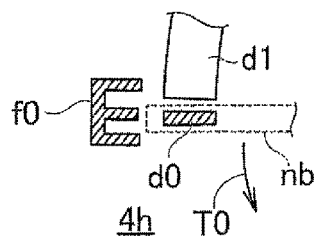
FIG. 3A
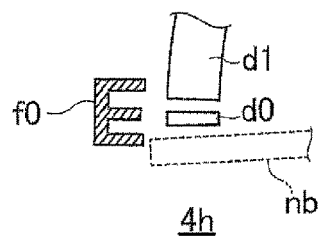
FIG. 3B
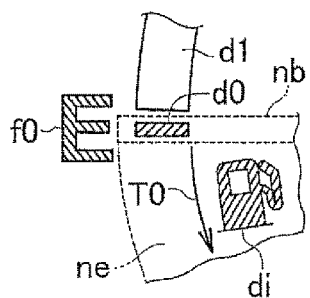
FIG. 3C
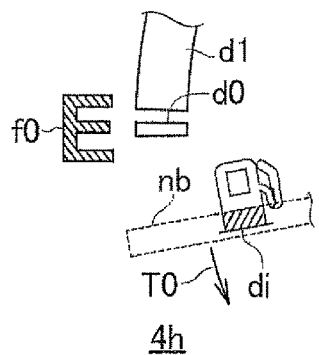
FIG. 3D
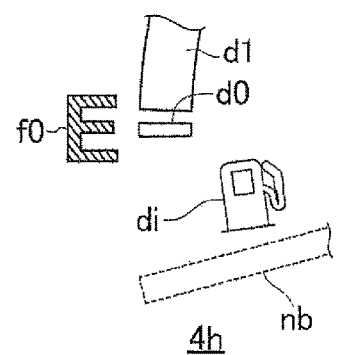
FIG. 3E

VEHICULAR POINTER-TYPE RESIDUAL QUANTITY METER Japanese Application No. 2015-126897 filed on Jun. 24, 2015, is hereby incorporated by reference in its entirety.

TECHNICAL FIELD

The present invention relates generally to a vehicular pointer-type residual quantity meter, or a meter having that can carry out a movement such as a rotation movement in a real space of a pointer unit so as to indicate a residual quantity relating to a motor vehicle, a residual fuel quantity, a residual battery capacity, etc.

BACKGROUND

For example, Japanese Patent Application Laid-open Publication No. 2007-271426, or JP 2007-271426A discloses display apparatus, such as speed meters. The disclosed speed meter includes a pointer, and a driver of a vehicle, e.g. an automobile, can understand a speed thereof by carrying out a rotation movement of the pointer according to the speed a current vehicle speed. Incidentally, the pointer is fixed to a rotary shaft so that rotation of the rotary shaft causes the pointer to rotate in a real space. The speed meter or display apparatus having such a pointer is called as "pointer-type speed meter" by a person skilled in the art. The pointer disclosed in JP 2007-271426A becomes bright or luminous when receiving light from a light-emitting diode, and a luminous part of the pointer is long and narrow in the same manner as traditional pointers not equipped with such a light-emitting diode.

Moreover, Japanese Patent Application Laid-open Publication No. 2015-078857, or JP 2015-078857A discloses pointer-type meters, for example. The disclosed pointer-type meter has a pointer including an elongated pointer body as well as a sectoral-shaped pointer body extension unit. In other words, a bright part, or an illuminating unit, of the pointer is formed by the elongated pointer body and the sectoral-shaped pointer body extension unit. Therefore, the pointer of the pointer-type meter may have the pointer body extension unit. In general, such a pointer body extension unit is able to improve the appearance of the pointer and/or to facilitate easy understanding of the pointer body extension unit by the driver, and therefore, the driver can easily grasp a scale of the pointer-type meter.

SUMMARY

The present inventors have confirmed, however, that the pointer-type meters disclosed in, for example, JP 2007-271426A and JP 2015-078857 have a difficulty in grasping a scale when such a pointer-type meter is arranged to form a pointer-type residual quantity meter for vehicles. More specifically, when the pointer indicates that the residual quantity is zero (i.e., when the pointer points the scale to indicate zero), lighting of an illuminating unit of the pointer may allow the driver to erroneously recognize that the residual quantity is more than zero. This will allow the driver to continue traveling of the vehicle even after the pointer indicates an empty as the residual quantity.

An object of the present invention is to provide a vehicular pointer-type residual quantity meter, which is capable of allowing the driver to easily recognize that the residual quantity is zero or the pointer unit indicates the empty. The above and other objects of the present invention will become apparent to a person skilled in the art from a reading of the following detailed description of preferred embodiments taken in conjunction with the accompanying drawings.

In order to allow a person skilled in the art understand easily the summary, some aspects in accordance to the present invention are as follows, for example.

In a first aspect, a vehicular pointer-type residual quantity meter comprising:

a display panel that has a scale part, the scale part allows a driver to recognize a residual quantity, and a non-scale part that differs from the scale part;

a pointer unit that is disposed behind the display panel;

a pointer driver body unit that carries out a movement of the pointer unit in a real space; and a control unit that controls the pointer driver body unit so that the pointer unit indicates one of metering regions in the scale part in replay to a current value of the residual quantity, the control part controls the pointer driver body unit so that when the residual quantity decreases to zero, the pointer unit moves from a metering region corresponding to a zero residual quantity in a direction opposite to a metering region corresponding to a residual quantity value greater than zero to the non-scale part of the display panel.

In accordance with the first aspect, when the residual quantity decreases to zero, the pointer unit moves in a direction where the residual quantity is less than zero, without staying in a position to indicate a zero residual quantity value. Therefore, the driver is prevented from having an illusion that the residual quantity is not zero even though the residual quantity is actually zero. Furthermore, the driver can readily recognize that the residual quantity is zero.

In a second aspect depending on the first aspect, the pointer unit may include a pointer that forms an illuminating section, and the vehicular pointer-type residual quantity meter may further comprise a light source for the illuminating section, for example.

In accordance with the second aspect, since a pointer forms an illuminating section, when the illuminating section, or a bright part of the pointer, points a zero residual quantity, it may cause the driver to incorrectly recognize due to illusion that the residual quantity is not zero. This problem does not actually take place because according to the second aspect, the illuminating section, or the bright part of the pointer, can move in a direction where the residual quantity is less than zero.

In a third aspect depending on the second aspect, the scale part may include a light-transmitting member that is capable of transmitting light from the light source, the non-scale part may include a light-shielding member that is capable of shielding light from the illuminating section, and when the residual quantity decreases to zero, the pointer moves from a position behind the light-transmitting member to a position behind the light-shielding member so as to prevent the pointer from being recognized by the driver, for example.

In accordance with the third aspect, with the illuminating section, or the bright part of the pointer, thus moved to the position behind the light-shielding member when the residual quantity decreased to zero, the illuminating section is now in a state not visually recognizable by the driver and, hence, does not create erroneous recognition by the driver due to illusion that the residual quantity is not zero.

In a fourth aspect depending on the second or third aspect, the control unit may control the light source in such a manner that the illuminating section is lighted on when the residual quantity is not zero, and the illuminating section may be lighted off when the residual quantity decreases to zero, for example.

In accordance with the fourth aspect, since the illuminating section (bright part of the pointer) is lighted off when the residual quantity decreases to zero, the diver is hardly possible to visually recognize the illuminating section now in an unlighted state, and therefore, it is effective to further reduce the possibility that the driver has an illusion that the residual quantity is not zero.

In a fifth aspect depending on the fourth aspect, when the residual quantity decreases to zero, the control unit may light off the illuminating section after the movement of the pointer unit is completed, for example.

In accordance with the fifth aspect, instead of lighting off the illuminating section (bright part of the pointer) immediately when the residual quantity becomes zero, the control unit lights off the illuminating section after the movement of the illuminating section is completed, and therefore, which allows the driver to visually confirm the movement of the illuminating section, thereby facilitating easy recognition by the driver that that the residual quantity is zero.

In a sixth aspect depending on any one of the third to fifth aspects, the pointer may include an oblong pointer body and a pointer body extension unit disposed adjacent to the pointer body, the pointer body and the pointer body extension unit together may form the illuminating section, and immediately before the residual quantity decreases to zero, the pointer body and the pointer body extension unit may remain recognizable by the driver, and when the residual quantity decreases to zero, the pointer unit may move to the non-scale part so as to prevent the pointer body and the pointer body extension unit from being recognized by the driver, for example.

In accordance with the sixth aspect, when the residual quantity decreases to zero, the illuminating section (bright part of the pointer) formed by the pointer body and the pointer body extension unit moves in the direction where the residual quantity is less than zero until it reaches to the non-scale part formed of the light-shielding member. Thus, the illuminating section now held in a shielded condition is no longer possible to cause erroneous recognition by the driver that the residual quantity is not zero.

In a seventh aspect depending on any one of the second to sixth aspects, the control unit may control the pointer driver body unit such that when the residual quantity decreases to zero, the pointer unit gradually moves to the non-scale part, for example.

In accordance with the seventh aspect, it ensures that when the residual quantity decreases to zero, the pointer unit gradually moves in the direction where the residual quantity is less than zero.

In a eighth aspect depending on any one of the second to sixth aspects, the control unit may control the pointer driver body unit such that when the residual quantity decreases to zero, the pointer unit rapidly moves to the non-scale part, for example.

In accordance with the eighth aspect, it ensures that when the residual quantity decreases to zero, the pointer unit rapidly moves in the direction where the residual quantity is less than zero.

BRIEF DESCRIPTION OF THE DRAWINGS

Each of FIGS. 1A and 1B is a specific configuration sample of a display panel and a pointer unit of a vehicular pointer-type residual quantity meter according to the present invention, or a front elevational view;

FIG. 2 is a schematic configuration sample of a vehicular pointer-type residual quantity meter according to the present invention, or a block diagram;

FIGS. 3A and 3B are front elevational views illustrative of the operation of the pointer unit shown in FIG. 1A;

FIGS. 3C to 3E are front elevational views illustrative of the operation of the pointer unit shown in FIG. 1B.

DETAILED DESCRIPTION OF THE PREFERRED EMBODIMENTS

Certain preferred structural embodiments of the present invention will be described in greater details below, by way of example only, with reference to the accompanying sheets of drawings.

Figure 1A:
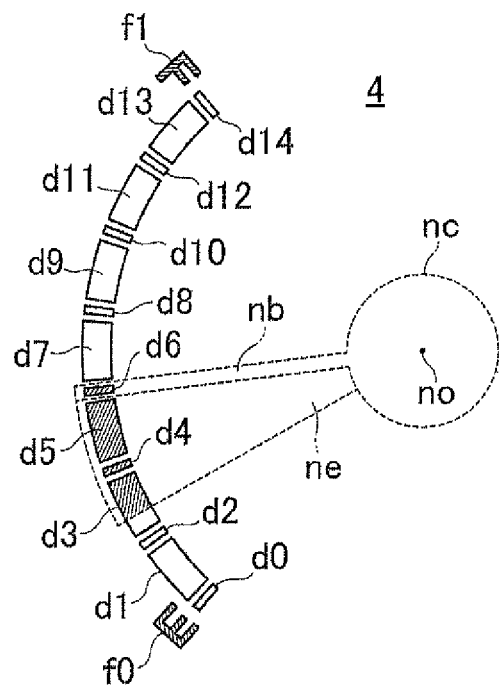
Figure 1B:
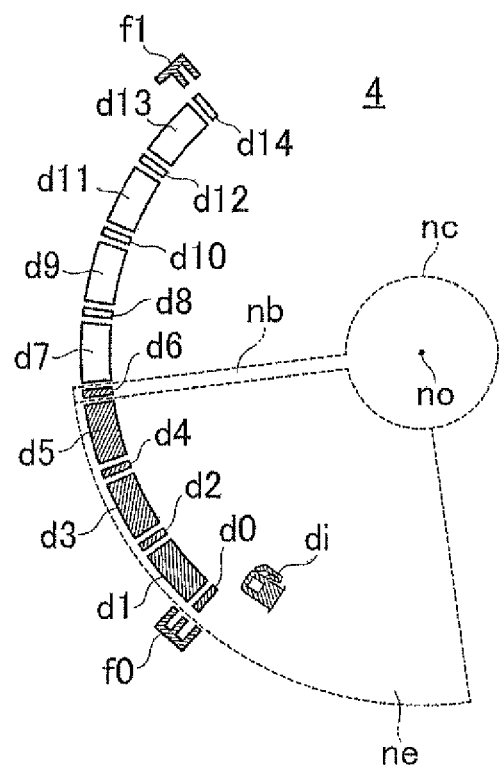

FIGS. 1A and 1B show in front elevational views two specific examples of configuration of a display panel and a pointer unit of a vehicular pointer-type residual quantity meter according to the preferred embodiment of the present invention. In FIG. 1A, the display panel 4 includes a scale part having a series of scale sections d0, d1, d2, d3, d4, d5, d6, d7, d8, d9, d10, d11, d12, d13 and d14 arranged along an arc-shaped line at intervals. The scale sections d0-d14 divide a metering space defined between a maximum value and a minimum value of a residual quantity (such as a residual fuel quantity or a residual battery capacity) of the vehicle. Preferably, the display panel 4 can further include a residual quantity value f0 which indicates that the residual quantity is zero, and a residual quantity value f1 which indicates that the residual quantity is full. The scale sections d0-14 and the residual quantity values f0-f1 may thus form indexes of the display panel 4. Each of the scale sections d0-d14 represents a corresponding one of metering regions of the scale part.

As shown in FIG. 1A, the pointer unit has at least a pointer. For example, the pointer includes a pointer body nb and a pointer body extension unit ne and can further include a proximal portion nc disposed on a central axis (rotational axis) n0 of the pointer. The pointer body nb and the pointer body extension unit ne shown in FIG. 1A have an oblong shape and a sectoral shape, respectively. The pointer shown in FIG. 1A is structurally the same as the pointer disclosed in JP 2015-078857A and is disposed behind the display panel 4. Furthermore, the pointer shown in FIG. 1A is angularly movable or turnable about the central axis n0 in the same manner as done for the pointer shown in JP 2015-078857A.

In FIG. 1A, the pointer body nb points a metering region d6 which corresponds to a substantially center value between the maximum value f1 and the minimum value f0 of the residual quantity, for example. The pointer body extension unit ne points three consecutive metering regions d5, d4 and d3 located below the metering region d6, for example.

A pointer body extension unit ne shown in FIG. 1B has a larger area than the pointer body extension en shown in FIG. 1A, so that when a pointer body nb associated with the pointer body extension unit ne indicates the metering region d6, the pointer body extension unit ne shown in FIG. 1B can point not only the metering regions d5, d4, d3 but also three other consecutive metering regions d2, d1 and d0. Furthermore, as shown in FIG. 1B, the display panel 4 may further include a design mark di which is indicative of the kind of residual quantity (fuel).

FIG. 2 shows in block diagram an example of configuration of the vehicular pointer-type residual quantity meter according to the present invention. As shown in this figure, the vehicular pointer-type residual quantity meter 10 includes the display panel 4 and a pointer unit 3. The display panel 4 and the pointer unit 3 may employ the specific structures shown in FIGS. 1A and 1B, for example. However, the display panel 4 and the pointer unit 3 shown in FIG. 2 should by no means be limited to those shown in FIGS. 1A and 1B but may include modifications in which the pointer unit 3 is devoid of the pointer body extension unit ne, and/or the display panel 4 is devoid of the residual quantity values f0, f1 (as well as the design mark di). As a further modification, the display panel 4 may have a scale part having a series of metering regions which is either larger, or alternatively smaller, in number than those shown in FIGS. 1A and 1B.

In FIG. 2, the vehicular pointer-type residual quantity meter 10 can further include a pointer driver body part or unit 2 and a control unit 1. The pointer driver body unit 2 may be formed by an electric motor, for example. The control unit 1 may be configured to input a piece of data indicative of a current residual quantity (in the form of an electric resistance value) via an on-vehicle LAN (local area network) such as CAN, to calculate a residual quantity from the inputted data piece, and to control the motor (pointer driver body unit) 2 based on the calculated residual quantity. The control unit 1 may be connected directly to a residual quantity sensor so that an output (such as an electric resistance value) from the residual quantity sensor is inputted to the control unit 1 without interposing the on-vehicle LAN.

When the pointer driver body unit 2, e.g. the motor, angularly moves or turns through an angle corresponding to the calculated residual quantity, the pointer body nb and the pointer body extension unit ne shown, for example, in FIG. 1A angularly move or turn about the central axis n0. Thus, the pointer driver body unit 2 constituted by the motor or the like is able to perform angular movement of the pointer unit 3 in a real space according to the residual quantity.

In each of FIGS. 1A and 1B, the pointer body nb and the pointer body extension unit ne together form an illuminating section (a bright part of the pointer) using light from a light source 5-1 such as an LED (light-emitting diode) in the same manner as done for the pointer disclosed in JP 2015-078857A, for example. As shown in FIG. 2, the control unit 1 is able to calculate or determine a current value required for the LED (light source) 5-1 to ensure that the illuminance or the brightness of the illuminating section (formed jointly by the pointer body nb and the pointer body extension unit ne) reaches a predetermined value, and to control a light-source driver circuit such as an LED driver 4-1 such that the calculated or determined current value is supplied to the LED (light source) 5-1, for example. An optical system 6-1 shown in FIG. 2 is formed by a reflecting surface, for example, and can reliably guide the light from the light source 5-1 to the pointer body nb and the pointer body extension unit ne.

In FIGS. 1A and 1B, the scale sections d0-d14 of the scale part can be formed by a light-transmitting member which can transmit light therethrough, the light being guided from the light source 5-1 via the optical system 6-1 to the pointer body nb and the pointer body extension unit ne. In the scale part having the scale sections d0-d14 shown in FIG. 1A, only the metering regions d6, d5, d4 and d3 are brightly illuminated, as indicated by hatching. On the other hand, in the scale part shown in FIG. 1B, only the metering regions d6, d5, d4, d3, d2, d1 and d0 are brightly illuminated, as indicated by hatching. The design mark d1 shown in FIG. 1B is also formed by a light-transmitting member which can transmit light therethrough, the light being guided to the pointer body extension unit ne. Thus, the design mark d1 is also brightly illuminated, as indicated by hatching.

In FIGS. 1A and 1B, the residual quantity values f0, f1 can be formed by a light-transmitting member which can transmit light therethrough, the light being guided from another light source (such as an LED) 5-2 shown in FIG. 2 via another optical system 6-2 to the scale part of the display panel 4. The residual quantity values f0, f1 are therefore brightly illuminated, as indicated by hatching. The control unit 1 shown in FIG. 2 is also able to calculate or determine a current value required for the LED (light source) 5-2 to ensure that the illuminance or the brightness of another illuminating section (formed by the residual quantity values f0, f1) reaches a predetermined value, and to control a light-source driver circuit such as an LED driver 4-2 such that a current of the calculated or determined current value is supplied to the LED (light source) 5-2.

In the vehicular pointer-type residual quantity meter 10 shown in FIG. 2, the light source 5-1 and/or the light source 5-2 may be omitted, in which instance the illuminating section of the pointer of the pointer unit 3 and/or the illuminating section formed by the residual quantity values f0, f1 may preferably be formed by or printed with a fluorescent member or material such as a fluorescent ink.

In FIGS. 1A and 1B, the display panel 4 includes the scale part (including the scale sections d0-d14, the residual quantity values f0, f1, and the design mark d1) and a non-scale part other than the scale part. The non-scale part is formed by a light-shielding member which is capable of shielding light. More specifically, the display panel 4 can be entirely formed by a light-transmitting member, and that part of the light-transmitting member (display panel 4) which corresponds to the non-scale part is formed by or printed with a light-shielding member or material such as a black ink.

FIGS. 3A and 3B are front elevational views illustrative of the operation of the pointer unit 3 (pointer body nb) shown in FIG. 1A, and FIGS. 3C, 3D and 3E are front elevational views illustrative of the operation of the pointer unit 3 (pointer body nb and pointer body extension unit ne) shown in FIG. 1B. In FIG. 1A, the residual quantity is indicated as being half of the full quantity. Further consumption will cause the residual quantity to become zero, as shown in FIG. 3A. In this instance, the pointer body nb points the metering region d0.

Meanwhile, the speed meter (pointer-type speed meter) disclosed in, for example, JP 2007-271426A is required to display the vehicle speed at all times pursuant to laws and regulations. Accordingly, when the vehicle speed decreases to zero, the pointer-type speed meter should allow the driver to recognize that the vehicle speed is zero. Likewise the conventional pointer-type speed meter, the pointer body nb shown in FIG. 3A may also continue to point the metering region d0 indicating that the residual quantity is zero.

However, in the vehicular pointer-type residual quantity meter 10, it may occur that when the pointer body nb continues to point the metering region d0, the driver erroneously recognizes that the pointer body nb indicates a residual quantity more than zero. Especially, when the pointer body nb is an illuminating section (bright part) of the pointer, lighting by the illuminating section (i.e., lightening of the metering region d0 by the illuminating section) might induce incorrect recognition by the driver that the residual quantity is more than zero. Based on the understanding that there are no legal restrictions on the display of the vehicular pointer-type residual quantity meter, the present inventors have made an improvement in the control unit 1 of FIG. 2 such that the pointer body nb can move in a direction where the residual quantity is less than zero.

More specifically, the control unit 1 controls the pointer driver body unit 2 such that when the residual quantity decreases to zero, the pointer body nb moves from the metering region d0 corresponding to a zero residual quantity in a direction (indicated by arrow T0 shown in FIG. 3A) opposite to the metering region d1 corresponding to a residual quantity value greater than zero to a non-scale part 4h (see FIG. 3B). As shown in FIG. 3B, since the pointer body nb is now disposed in a position behind the non-scale part 4h (formed of the light-shielding member), the metering region d0 becomes dim or unlighted even when the pointer body nb has an illuminating section (bright part). Thus, the driver is allowed to easily recognize that the residual quantity is zero (or in an empty state).

Referring back to FIG. 1B, on a lower side of the metering region d0 corresponding to the zero residual quantity f0, that is, on a side which is opposite to the metering region d1 corresponding to a residual quantity more than zero, the display panel 4 may include the design mark di indicative of the type of residual quantity (fuel). In FIG. 1A, the residual quantity is indicated as being half of the full quantity. Further consumption will cause the residual quantity to become zero, as shown in FIG. 3C. In this instance, the pointer body nb points the metering region d0. The pointer body nb and the pointer body extension unit ne disposed adjacent to the pointer body nb together form an illuminating section (bright part of the pointer) so that the metering region d0 and the design mark di are both lighted up or illuminated, as indicated by hatching shown in FIG. 3C.

When the residual quantity decreases to zero, lighting of the metering region d0 by the pointer body nb (forming part of the illuminating section of the pointer) may cause erroneous recognition by the driver that the residual quantity is more than zero. To avoid this problem, the control unit 1 shown in FIG. 2 controls the pointer body nb in such a manner to move in a direction where the residual quantity is less than zero. More specifically, when the pointer body nb moves downwardly to a position below zero and points a lower party of the design mark di, the metering region d0 becomes dim or unlighted and only the lower part of the design mark di is lighted up or illuminated, as indicated by hatching shown in FIG. 3D. In other words, the pointer body nb is disposed in a position behind the non-scale part 4h other than the scale part (including the scale sections d0-d14), so that the driver can readily recognize that the residual quantity is zero (or in the empty state).

In view of partial lighting or illumination of the design mark di, the control unit 1 may further continue control of the pointer body nb. More specifically, the control unit 1 is able to control the pointer unit 3 such that the pointer body nb (and the pointer body extension unit ne) move downward to a position located below the scale section d0 and the design mark di to the extent that the scale sections d0-d14 and the design mark di located below the scale sections d0-d14 become dim or unlighted, as shown in FIG. 3E. This arrangement further facilitates easy recognition by the driver that the residual quantity is zero (or in the empty state).

In FIGS. 3B and 3E, the control unit 1 may control the light source 5-1 in such a manner as to light off the pointer body nb (and the pointer body extension unit ne) after the downward movement of the pointer body nb (and the pointer body extension unit ne) is completed. Alternatively, lighting of the pointer body nb (and the pointer body extension unit ne) may be continued even after the downward movement of the pointer body nb (and the pointer body extension unit ne) is completed.

In FIGS. 3B and 3E, the control unit 1 shown in FIG. 2 continues to maintain lighting of the residual quantity values f0, f1 regardless of the presence/absence of the downward movement of the pointer unit 3 including the pointer body nb and the pointer body extension unit ne. However, lighting of the residual quantity values f0, f1 may be terminated after the downward movement of the pointer unit 3 is completed.

Figure 4:
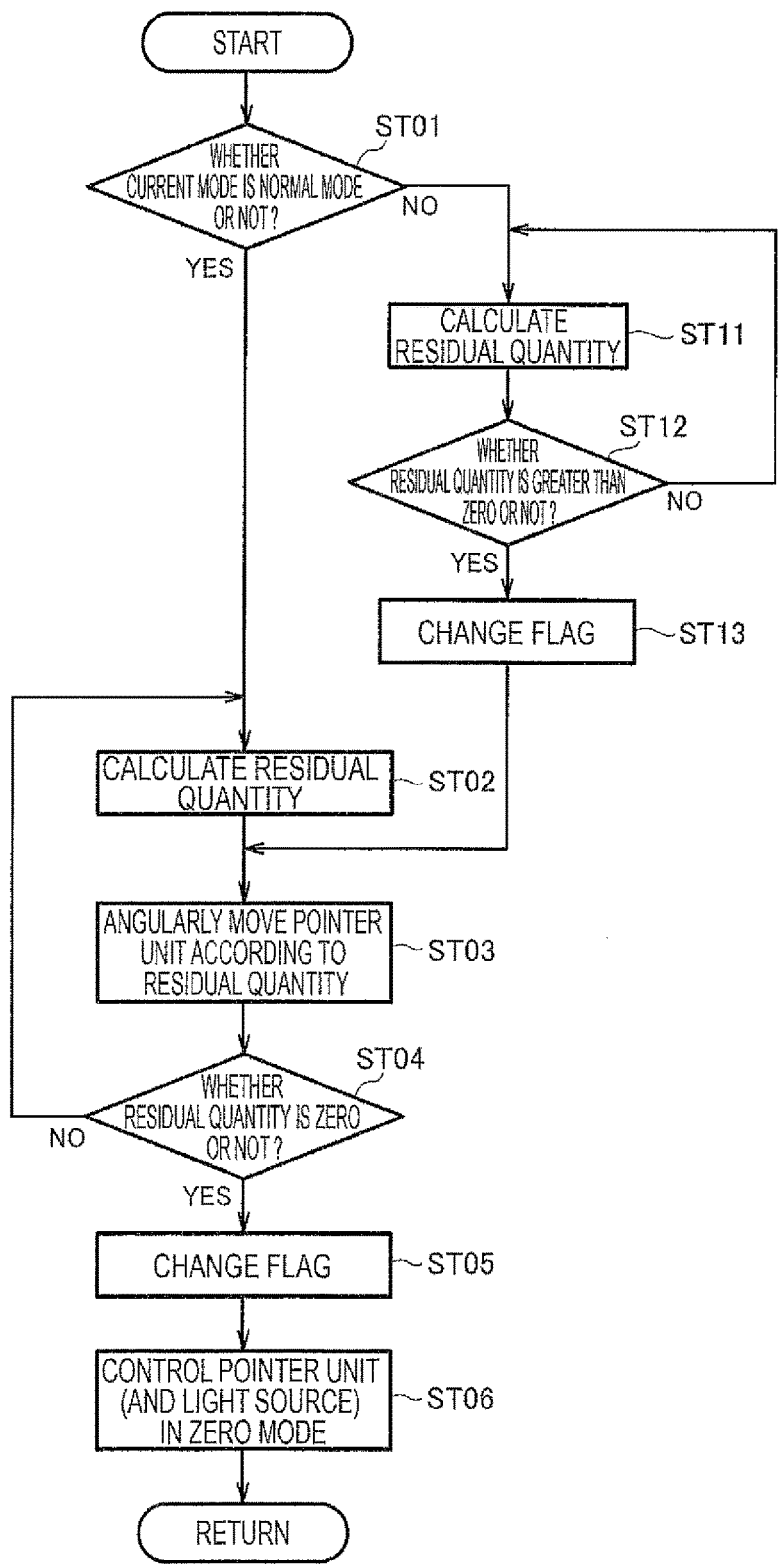
FIG. 4 is a flowchart showing an example of operation of the vehicular pointer-type residual quantity meter shown in FIG. 2.

FIG. 4 is a flowchart showing an example of operation of the vehicular pointer-type residual quantity meter 10 shown in FIG. 2. When an ignition key (not shown) of the vehicle is turned to an ON position, the vehicular pointer-type residual quantity meter 10 is started up and determines whether the current mode is a normal mode or not (step ST01 shown in FIG. 4). In the normal mode, the residual fuel quantity of the vehicle is not zero (or in an empty state) and the vehicle is able to travel. The vehicle includes an internal combustion engine (gasoline engine) using a fuel such as gasoline. As an alternative, the vehicle may be an electric vehicle (EV) or a hybrid electric vehicle (HEV) equipped with a traveling electric motor using a traveling battery.

When the ignition key or a power button (not shown) is operated to start up the vehicle, the residual fuel quantity or the residual traveling battery capacity is not zero, and the control unit 1 of the vehicular pointer-type residual quantity meter 10 sets a residual quantity flag to "1". With the residual quantity flag "1", the control unit 1 takes in data indicative of a residual quantity. In case of the vehicle equipped with a gasoline engine, the data indicative of the residual gasoline quantity is typically represented by an electric resistance value. For instance, when the residual gasoline quantity is full, the resistance value is 48Ω, and when the residual quantity of gasoline is zero, the resistance value is 760Ω. The control unit 1 calculates a current residual quantity from the data (resistance value) indicative of the residual quantity (step ST02 shown in FIG. 4), determines a rotational angle for the pointer unit 3 corresponding to the calculated residual quantity, and controls the pointer driver body unit 2 (electric motor for the pointer) in such a manner as to realize the determined rotational angle of the pointer unit 3 (step ST03 shown in FIG. 4).

Then, the control unit 1 determines whether the calculated residual quantity (current residual quantity) is zero or not (step ST04) and repeats execution of steps ST02-ST04 until the calculated residual quantity becomes zero. When the residual quantity decreases to zero, the control unit 1 sets the residual quantity flag to "0" (step ST05 shown in FIG. 4). With the residual quantity flag "0", the normal mode shifts to a zero mode in which the pointer unit 3 is controlled to move according to the zero mode (non-normal mode) rather than the residual quantity (step ST06 shown in FIG. 4).

In the case where the pointer unit 3 and the display panel 4 shown in FIG. 2 employ the pointer body b and the scale sections d0-d14 shown in FIG. 1A, the step ST06 of FIG. 4 is executed under control by the control unit 1 such that the pointer body nb angularly moves or turns in a counterclockwise direction (indicated by arrow T0 shown in FIG. 3A) from a first position in which a tip end of the pointer body nb points the metering region f0, to a second position in which the tip end of the pointer body nb points a region in the non-scale part 4h located below the metering region d0, as shown in FIG. 3B.

In FIG. 3B, due to the absence of the pointer body nb located behind the metering region d0, the metering region d0 is kept in an unlighted state. In other words, in the condition shown in FIG. 3B, the driver is not possible to visually recognize the pointer body nb disposed behind the non-scale part 4h formed of the light-shielding member. In this instance, the control unit 1 shown in FIG. 2 may not turn off the light source 5-1 for the pointer body nb (or set a current value flowing through the LED to zero). However, depending on the illuminance/brightness of the pointer body nb and the light-shielding efficiency/light-transmitting efficiency of the non-scale part 4h, the driver may recognize the pointer body nb disposed behind the non-scale part 4h. Furthermore, the pointer body nb disposed behind the non-scale part 4h can still be recognized by the driver when the driver is high in sitting height or when the driver looks into the vehicular pointer-type residual quantity meter 10. To deal with this problem, the control unit 1 shown in FIG. 2 may turn off the light source 5-1 (step ST06 shown in FIG. 4).

In the case where the pointer unit 3 and the display panel 4 shown in FIG. 2 employ the pointer body nb and the scale sections d0-d14 and the design mark di shown in FIG. 1B, the step ST06 shown in FIG. 1 is executed under control by the control unit 1 such that the pointer body nb angularly moves or turns in a counterclockwise direction (indicated by arrow T0 shown in FIGS. 3C and 3D) from a first position in which a tip end of the pointer body nb points the metering region f0 and the design mark di, to a second position in which the tip end of the pointer body nb points a region in the non-scale part 4h located below the metering region d0 and the design mark di, as shown in FIG. 3E.

In this instance, the tip end of the pointer body nb may be moved to a region in the non-scale part 4h located below the metering region d0 (more particularly in a region located between the metering region d0 and the design mark di) in the same manner as done for the pointer body nb shown in FIG. 3B, and the pointer body extension unit ne may indicate or illuminate the design mark di.

In FIG. 3E, the driver is not able to visually recognize the pointer body nb disposed behind the non-scale part 4h formed of the light-shielding member. In this instance, the control unit 1 shown in FIG. 2 may not turn off the light source 5-1 for the pointer body nb. However, depending on the illuminance/brightness of the pointer body nb and the light-shielding efficiency/light-transmitting efficiency of the non-scale part 4h, the driver may recognize the pointer body nb disposed behind the non-scale part 4h. Furthermore, the pointer body nb disposed behind the non-scale part 4h can still be recognized by the driver when the driver is high in sitting height or when the driver looks into the vehicular pointer-type residual quantity meter 10. To deal with this problem, the control unit 1 shown in FIG. 2 may turn off the light source 5-1 (step ST06 shown in FIG. 4).

When moving the pointer body nb from the first position corresponding to the metering region d0 to the second position corresponding to the region in the non-scale part 4h disposed below the design di, the control unit 1 shown in FIG. 2 may move the pointer unit 3 including the pointer body nb and the pointer body extension unit ne in a gradual manner. As an alternative, the control unit 1 may move the pointer unit 3 rapidly. In combination with gradual moving of the pointer unit 3, the control unit 1 shown in FIG. 2 may turn off the light source 5-1 in such a manner that the light quantity of the light source 5-1 or the current value supplied to the light source 5-1 decreases gradually (step ST06 shown in FIG. 4).

After the movement of the pointer unit 3 (and the control of the light-source 5-1) are completed at step ST06, the control unit 1 shown in FIG. 2 repeatedly executes steps ST11 and ST12 as long as the current mode determined at step ST01 is the zero mode. By steps ST11 and ST12, it is possible to determine whether oil-feeding of the vehicle is completed. More specifically, for oil feeding, the driver turns the ignition key to an OFF position. After completion of the oil feeding, the driver turns the ignition key to the ON position. Since the current mode is the zero mode, the control unit 1 calculates a current residual quantity and determines whether the calculated current residual quantity is greater than zero (steps ST11 and ST12). When the oil feeding is completed, the control unit 1 sets the residual quantity flag to "1" (step ST13 shown in FIG. 4).

When the residual quantity flag is set to "1", the zero mode is switched to the normal mode in which the pointer unit 3 moves according to the residual quantity (step ST03 shown in FIG. 4).

Obviously, various minor changes and modifications of the present invention are possible in the light of the above teaching. It is therefore to be understood that within the scope of the appended claims the invention may be practiced otherwise than as specifically described.

What is claimed is:

1. A vehicular pointer-type residual quantity meter comprising:
 a display panel that has a scale part, the scale part allows a driver to recognize a residual quantity, and a non-scale part that differs from the scale part;
 a pointer unit that is disposed behind the display panel;
 a pointer driver body unit that carries out a movement of the pointer unit in a real space; and
 a control unit that controls the pointer driver body unit whereby the pointer unit indicates one of metering regions in the scale part in replay to a current value of the residual quantity, and the control unit controls the pointer driver body unit whereby, when the residual quantity decreases to zero, the pointer unit moves from a metering region corresponding to a zero residual quantity in a direction opposite to a metering region corresponding to a residual quantity value greater than zero to the non-scale part of the display panel,
 the pointer unit includes a pointer that forms an illuminating section,
 the vehicular pointer-type residual quantity meter further comprises a light source for the illuminating section,
 the scale part includes a light-transmitting member that is capable of transmitting light from the light source,
 the non-scale part includes a light-shielding member that is capable of shielding light from the illuminating section,
 when the residual quantity decreases to zero, the pointer moves from a position behind the light-transmitting member to a position behind the light-shielding member so as to prevent the pointer from being recognized by the driver, the pointer includes an oblong pointer body and a pointer body extension unit disposed adjacent to the pointer body, the pointer body and the pointer body extension unit together form the illuminating section, and immediately before the residual quantity decreases to zero, the pointer body and the pointer body extension unit remain recognizable by the driver, and when the residual quantity decreases to zero, the pointer unit moves to the non-scale part so as to prevent the pointer body and the pointer body extension unit from being recognized by the driver.

2. The vehicular pointer-type residual quantity meter according to claim 1, the control unit controls the light source in such a manner that the illuminating section is lighted on when the residual quantity is not zero, and the illuminating section is lighted off when the residual quantity decreases to zero.

3. The vehicular pointer-type residual quantity meter according to claim 2, when the residual quantity decreases to zero, the control unit lights off the illuminating section after the movement of the pointer unit is completed.

4. The vehicular pointer-type residual quantity meter according to claim 1, the control unit controls the pointer driver body unit such that when the residual quantity decreases to zero, the pointer unit gradually moves to the non-scale part.

5. The vehicular pointer-type residual quantity meter according to claim 1, the control unit controls the pointer driver body unit such that when the residual quantity decreases to zero, the pointer unit rapidly moves to the non-scale part.

* * * * *